United States Patent
Chambers

[15] 3,659,155
[45] Apr. 25, 1972

[54] CURRENT SENSING APPARATUS

[72] Inventor: William W. Chambers, Anaheim, Calif.
[73] Assignee: Robertshaw Controls Company, Richmond, Va.
[22] Filed: Mar. 3, 1969
[21] Appl. No.: 814,491

Related U.S. Application Data

[63] Continuation-in-part of Ser. No. 774,863, Nov. 12, 1968, abandoned.

[52] U.S. Cl..........................317/148.5 B, 307/131, 307/154, 219/476, 219/497, 219/501, 317/DIG. 5
[51] Int. Cl........................................H01h 47/32, H05b 3/02
[58] Field of Search....................317/137, 148.5 B; 307/131, 307/154; 219/476, 497, 501

[56] References Cited

UNITED STATES PATENTS 3,329,869 7/1967 Obenhaus........................317/148.5 B
3,419,756 12/1968 Philibert et al..................317/148.5 B

*Primary Examiner*—L. T. Hix
*Attorney*—Fulwider, Patton, Rieber, Lee & Utecht

[57] ABSTRACT

This application relates to a fan control apparatus for actuating a fan to circulate air over a plurality of electric environmental change elements included in a temperature control system. The apparatus includes a fan in circuit with switch means which is operative in response to an electrical signal to actuate the fan. A sensing element is disposed in electrically inductive relationship with the environmental change elements and is responsive to energization of any one of such elements to generate said electrical signal and effect closing of the switch means to actuate the fan. The signal will continue and maintain the fan operative as long as the environmental change elements are energized and will be rendered inoperative when the last change element is de-energized thus discontinuing said signal and deactuating said fan.

7 Claims, 2 Drawing Figures

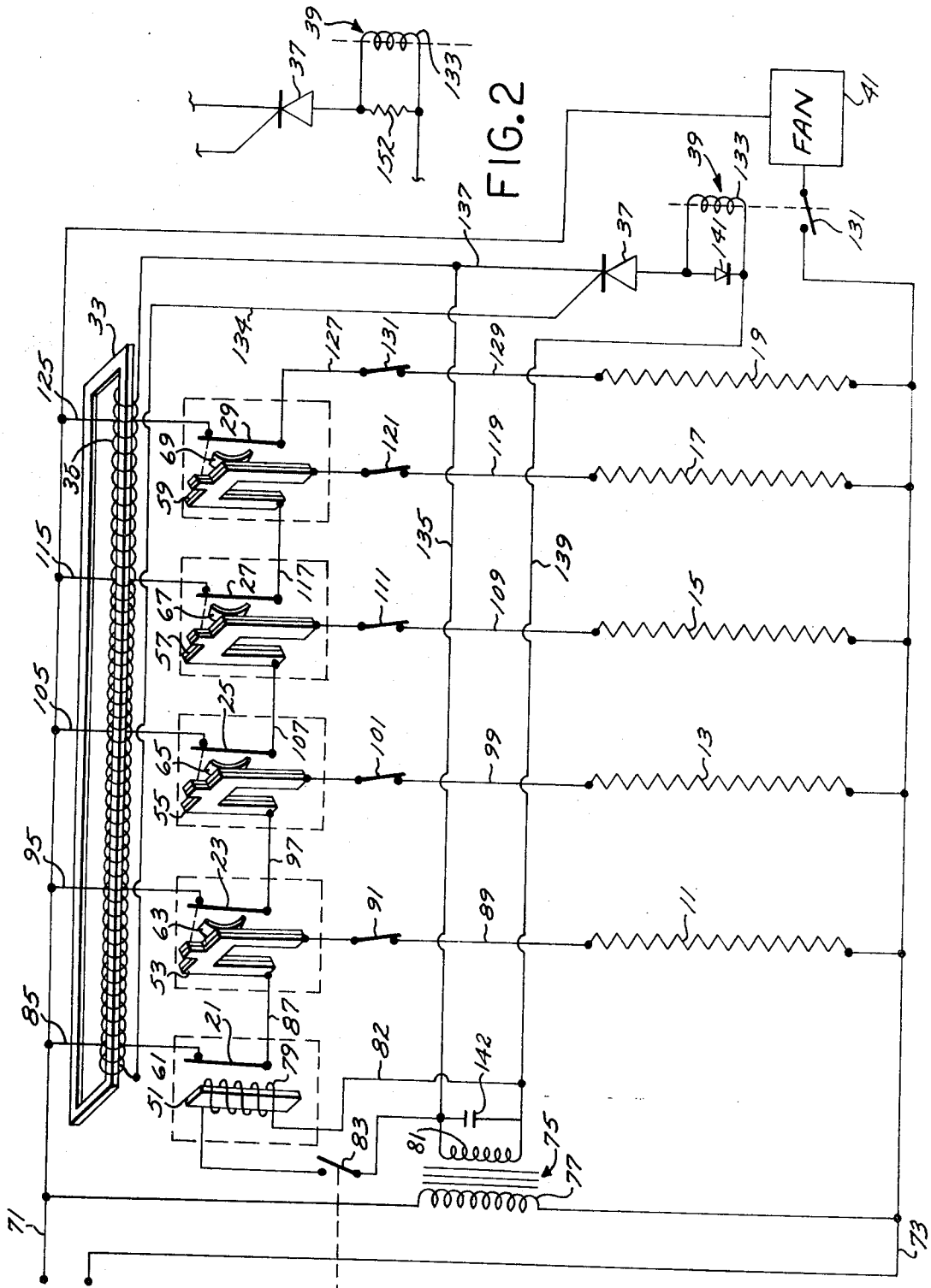

3,659,155

CURRENT SENSING APPARATUS

This application is a continuation-in-part of Ser. No. 774,863, filed Nov. 12, 1968, and now abandoned.

BACKGROUND OF THE INVENTION

1. Field of the Invention

The present invention relates to fan control devices which are utilized to force air in heat exchange relationship with an environmental change device.

2. Description of the Prior Art

It has been common practice to sense current conduction in an electrical lead to carry out various operations, such as energization of a load. However, applicant is unaware of any prior art current sensing control apparatus which senses the current conduction in a lead and amplifies the sensed signal to fire a gate controlled switching device.

SUMMARY OF THE INVENTION

The present invention is characterized by trigger means disposed in electrically inductive relationship with an electrical lead and responsive to a predetermined magnitude of current therein to generate a signal for operating a switch in a load circuit.

The objects and advantages of the present invention will become apparent from the consideration of the following detailed description when taken in conjunction with the accompanying drawing.

DESCRIPTION OF THE DRAWING

FIG. 1 is a schematic view of a fan control apparatus embodying the present invention; and FIG. 2 is a modification of the fan control apparatus shown in FIG. 1.

DESCRIPTION OF THE PREFERRED EMBODIMENT

The fan control apparatus shown in FIG. 1 may be conveniently utilized to force air over a plurality of parallel connected environmental heating elements 11, 13, 15, 17 and 19 which are connected in series with respective time delay switches 21, 23, 25, 27 and 29. A ferro-magnetic current sensing core, generally designated 33, encircles the leads to the switches 21, 23, 25, 27 and 29 and has an amplification coil 35 wrapped on one leg thereof for providing a triggering signal on the gate of a controlled switch means in the form of a silicon controlled rectifier (SCR) 37 whenever any one of the such switches are closed to thereby energize a relay, generally designated 39, and actuate blower fan 41 to circulate air over the heaters 11, 13, 15, 17 and 19 and continue such circulation until all the switches 21, 23, 25, 27 and 29 are opened.

Each of the delay switches 21, 23, 25, 27 and 29 are driven by respective bimetalic blades 51, 53, 55, 57 and 59. Movement of such blades toward the switch closed position is restricted by respective snap-acting springs 61, 63, 65, 67 and 69, which springs have the characteristics of providing a bias to resist closure of the blades until a predetermined force is applied thereto, at which point the bias of such springs is overcome and they relieve to permit rapid closure of the respective switches.

Current to the environmental heating heating elements 11, 13, 15, 17 and 19 is provided by power leads 71 and 73. A transformer, generally designated 75 has its primary coil 77 connected between the leads 71 and 73. A heat motor 79 encircles the first stage blade 51 and is connected across the secondary coil 81 of the transformer 75 by means of a lead 82 having a control switch 83 therein. The control switch 83 is coupled with a thermostat 84 which is responsive to changes in the environmental temperature to effect closure of such switch 83.

The switch 21 is connected between the leads 71 and 73 by means of leads 85, 87, 89, the second stage blade 53 and a limit switch 91. Similarly the switch 23 is connected between the power leads 71 and 73 by means of leads 95, 97, 99, the blade 55, and a limit switch 101; the switch 25 by leads 105, 107, 109, the blade 57 and limit switch 111; the switch 27 by leads 115, 117, 119, blade 59 and limit 121; and the switch 29 by means of leads 125, 127, 129 and a limit switch 131.

The blower fan 41 is connected between the leads 71 and 73 and is connected in series with the switch 131 of the relay 39. The coil 133 of the relay 39 is connected across the secondary coil 81 of the transformer 75 by means of leads 135, 137 and 139. The load circuit of the SCR 37 is connected in series between the transformer coil 81 and the relay coil 133 to control current flow therebetween, the gate of such SCR being connected with the amplication coil 35 by a lead 134.

Connected across the relay coil 133 is a free-wheeling diode 141 to direct current flow through the coil 133 during positive going half cycles and to, itself, provide a path for current flow during negative going half cycles to eliminate hum and prevent voltage build up in the coil 133.

A capacitor 142 is connected across the secondary coil 81 of the transformer 75 to absorb momentary current surges resulting from closure of the switch to thereby prevent imposition of such current on the anode and cathode of the SCR 37 to cause triggering thereof.

In operation, the thermostate 83 is set at the desired environmental temperature and when the temperature falls below the selected level, the switch 83 will be closed to provide current to the heat motor 79 of the first stage switch 21. As noted above closure of the switch 83 will cause a momentary surge of current from the secondary coil 81 which will be absorbed by the capacitor 142 to prevent the SCR 37 from being triggered by its cathode being driven sufficiently far negative relative to its gate or its anode being driven sufficiently far positive relative to its gate to cause triggering. After a selected period of time, the motor 79 will heat the first stage blade 51 sufficiently to cause its upper end to flex to the right and overcome the bias of the spring 61 causing such spring to relieve and snapping the switch 21 closed. Closure of the switch 21 provides current through the blade 53 of the second stage switch 23 and through the first stage heating element 11.

Current flow through the lead 85 to the first stage switch 21 induces a magnetic field around such lead, which field is concentrated in the rectangular core 33 thus inducing current flow in the sensing coil 35. Current in the coil 35 will be conducted to the gate of the SCR 37 by the lead 134 thus triggering such SCR and providing for current flow from the secondary coil 81 of the transformer 75 to the coil 133 of the relay 39. Energization of the coil 133 effects closure of the switch 131 to energize the fan 41 thus assuring immediate circulation of air over the energized resistance heater 11 to prevent overheating thereof.

A predetermined time after closure of the switch 21 and commencement of current flow through the blade 53 of the second stage switch 23, such blade will flex to overcome the bias of the spring 63 and effect snap closing of the switch 23 thereby commencing current flow through the third stage blade 35 and second stage resistant heater 13. A selected period of time thereafter such blade 55 will flex to close the third switch 25 thereby energizing the fourth stage blade 57 and the third stage heating element 15. Subsequently, the fourth stage switch 27 will be closed and, thereafter, the fifth stage switch 29 will be closed in a like manner.

Under normal conditions, the heat generated from the heating elements 11, 13, 15, 17 and 19 and circulated by means of a fan 41 will heat the environment sufficiently to cause the thermostat 84 to open the switch 83 thus discontinuing current to the heat motor 79 of the first stage switch 21. The first stage blade 51 will then cool and be snapped open by the spring 61 to discontinue current flow through the first stage heating element 11. Opening of the switch 21 will likewise discontinue current flow through the second stage blade 33 thus opening the second stage switch 23 and discontinuing current flow through the third stage blade 55 and the second stage heating element 13. The remaining switches 25, 27 and 29 will likewise be opened in sequence and when the last stage switch 29 is opened to discontinue current flow through the lead 125 connected therewith, current from the sensing coil 35 to the gate of the SCR 37 will be discontinued rendering such SCR non-conductive and de-energizing the coil 133 of the relay 39 to open the fan switch 131 and discontinue operation of the fan 41.

It is of particular importance that the fan control is operative whenever any one of the switches 21, 23, 25, 27 or 29 is closed to provide air circulation over the energized heat element 11, 13, 15, 17 or 19 to prevent overheating thereof. The fact that the leads to each one of the switches 21, 23, 25, 27 and 29 is sensed will assure operation of the fan even in the case of temporary loss of power and subsequent application thereof where each of the blades 51, 53, 55, 57 and 59 will commence cooling simultaneously when power is lost and will open in accordance with the time constant for the particular blade and, when the power recommences, if, for example, the switch 25 is the only one closed the fan 41 will still be operated to maintain the element 15 cooled.

While the triggering element has been described as an SCR, obviously a triac could be substituted therefore.

The modification shown in FIG. 2 includes a resistor 152 which is substituted for the diode 141 shown in FIG. 1 to thus partially block current flow during forward going half cycles to direct a portion of such current through the coil 133 and to, itself, form a path for flow of current induced by decay of the field around the coil 133 during negative going half cycles.

From the foregoing it will be apparent that the fan control system of present invention is straight forward in design and economical to manufacture. The control apparatus will provide a long and service-free operational life and will insure operation of the fan whenever any one of the heating elements are energized. Also, since the sensor coil is electrically isolated from the leads to the respective heating elements, the fan relay may be operated from the power leads as well as from the secondary coil of the transformer.

Various modifications and changes may be made with regard to the foregoing detailed description without departing from the spirit of the invention.

I claim

1. Current sensing control apparatus for operation of an electrical load circuit and comprising:
   gate controlled switch means for controlling current in said load circuit;
   a plurality of switches;
   electrical leads connected with said switches and leading to separate electrical elements;
   time delay means for actuating said switches at different times;
   current sensing means inductively coupled to said electrical leads and responsive to current flow in any one of said electrical leads to produce an electrical signal; and
   amplification means electrically coupled to said sensing means and to the gate of said switch means and operable to receive said electrical signal and amplify it to produce said triggering signal whereby current flowing in any one of said electrical leads will be sensed by said sensing means to produce said electrical signal and said amplification means will amplify said signal to impose said triggering signal on said gate to trigger said switch means and operate said load circuit.

2. Current sensing control apparatus as set forth in claim 1 wherein:
   said sensing means includes a ferromagnetic core; and
   said amplification means includes coil means wound on said core.

3. Current sensing control apparatus as set forth in claim 1 that includes:
   capaticance means connected with the gate of said switch means to absorb current surges introduced thereto to prevent accidental actuation of said switching means.

4. Current sensing control apparatus as set forth in claim 1 wherein:
   said electrical elements are in the form of resistance heating elements.

5. Current sensing control apparatus as set forth in claim 1 wherein:
   said electrical elements are in the form of temperature change element; and
   said load circuit includes fan means responsive to operation of said load circuit to circulate fluid in heat exchange relationship with said temperature change elements whereby said fan means will be operated whenever any of said temperature change elements is energized to thereby prevent said temperature change elements from reaching excessive temperature.

6. Current sensing control apparatus as set forth in claim 1 wherein:
   said electrical elements are in the form of heating elements; and
   said load circuit includes fan means responsive to operation of said load circuit for circulating fluid in heat exchange relationship with said heating elements whereby said fan means will be actuated whenever current is conducted in any one of said electrical leads.

7. Current sensing control apparatus as set forth in claim 5 that includes:
   thermostat means for sensing the temperature of the fluid circulated in heat exchange relationship with said temperature change elements and connected with said temperature change elements, said thermostat being responsive to the temperature of said fluid falling outside a predetermined range to actuate said temperature change elements.

* * * * *